R. E. HELLMUND.
RECUPERATIVE SYSTEM FOR ALTERNATING CURRENT COMMUTATOR MOTORS.
APPLICATION FILED SEPT. 9, 1916.

1,374,564.

Patented Apr. 12, 1921.

2 SHEETS—SHEET 1.

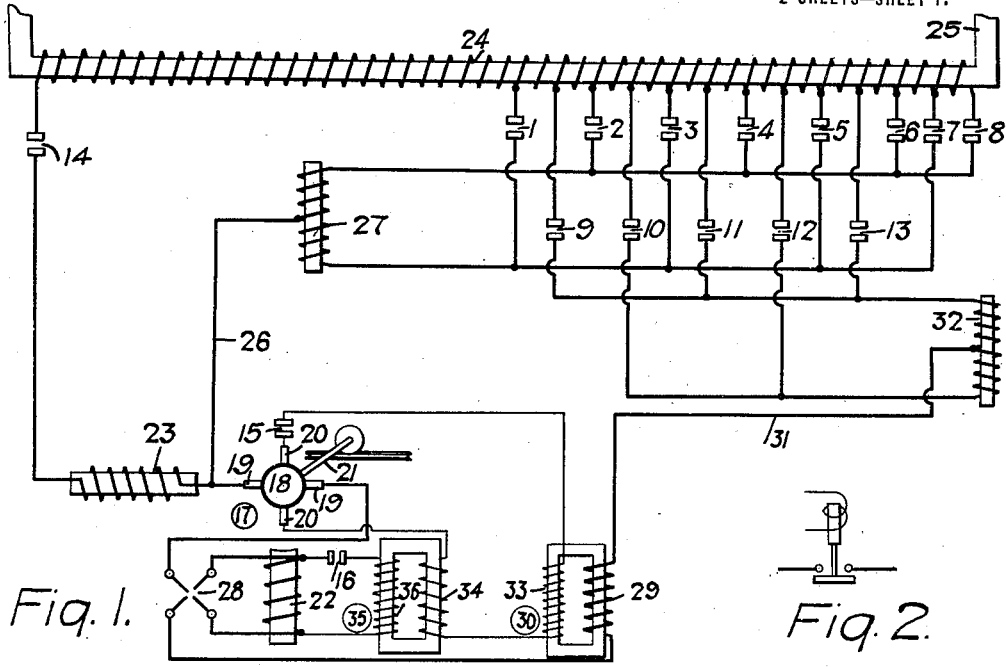

Fig. 1.

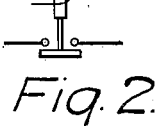

Fig. 2.

Fig. 3.

| | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Accelerating | A | | | | | o | o | | | | | | o | o | | o | | |
| | B | | | | | o | o | | | | | | o | o | | o | o | |
| | C | | | | | o | o | | | | | | o | o | | o | o | o |
| | D | | | o | o | | | | | | | | o | o | | o | o | o |
| | E | | o | o | | | | | | | | | o | o | | o | o | o |
| | F | | o | o | | | | | | | | | | | o | o | o | o |
| | G | o | o | | | | | | | | | | | | o | o | o | o |
| Recuperating | H | o | o | | | | | | | | | | | | | o | | |
| | I | o | o | | | | | | | | | | | | | o | o | |
| | J | o | o | | | | | | | | | | | o | o | o | o | |
| | K | | o | o | | | | | | | | | | o | o | o | o | |
| | L | | | o | o | | | | | | | | | o | o | o | o | |
| | M | | | | o | o | | | | | | | | o | o | o | o | |
| | N | | | | | o | o | | | | | | | o | o | o | o | |
| | O | | | | | | o | o | | | | | | o | o | o | o | |
| | P | | | | | | | o | o | | | | | o | o | o | o | |
| | Q | | | | | | | o | o | | | o | o | | o | o | o | |
| | R | | | | | | | o | o | | o | o | | | o | o | o | |
| | S | | | | | | | o | o | o | o | | | | o | o | o | |

WITNESSES:
RJKidge
DCDavis

INVENTOR
Rudolf E. Hellmund.
BY
Chesley G Carr
ATTORNEY

R. E. HELLMUND.
RECUPERATIVE SYSTEM FOR ALTERNATING CURRENT COMMUTATOR MOTORS.
APPLICATION FILED SEPT. 9, 1916.

1,374,564.

Patented Apr. 12, 1921.
2 SHEETS—SHEET 2.

WITNESSES:

INVENTOR
Rudolf E. Hellmund.
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

RECUPERATIVE SYSTEM FOR ALTERNATING-CURRENT COMMUTATOR-MOTORS.

1,374,564.     Specification of Letters Patent.     Patented Apr. 12, 1921.

Application filed September 9, 1916. Serial No. 119,265.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Recuperative Systems for Alternating-Current Commutator-Motors, of which the following is a specification.

My invention relates to recuperative systems for alternating-current motors of the inducing-field, commutator type, and it has for its object to provide a system of the character designated wherein the motors may be employed in recuperative operation substantially to a standstill.

Another object of my invention is to provide an accelerating and recuperative system for a motor of the character designated that shall embody relatively few control switches but shall provide, nevertheless, smooth acceleration and deceleration over wide ranges of speed.

Figure 8:
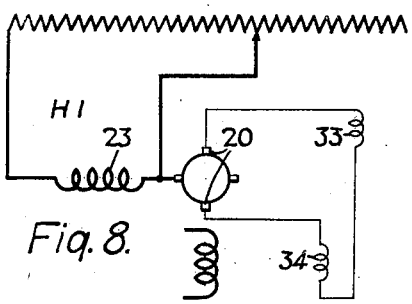
Figure 9:
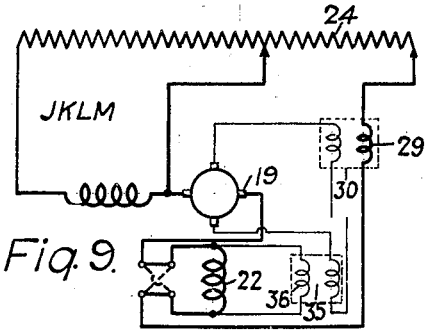
Figure 10:
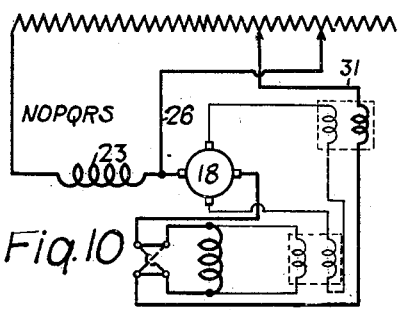
Figure 7:
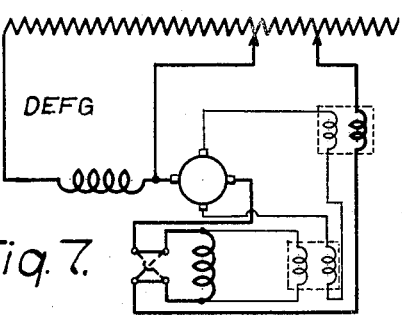
Figure 11:
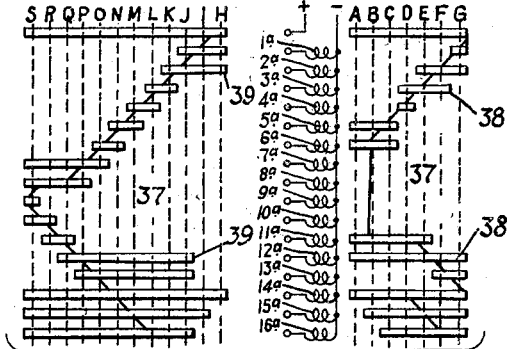

In the accompanying drawings, Figure 1 is a diagrammatic view of an alternating-current motor of the inducing-field commutator type, together with its attendant supply and control circuits, embodying a preferred form of my invention; Fig. 2 is a simplified view, in elevation, of a preferred form of electromagnetic switch to be employed in the system of Fig. 1; Fig. 3 is a sequence chart illustrating the preferred order of switch operation in the system of Fig. 1 to carry out my invention; Figs. 4 to 7, inclusive, are simplified diagrammatic views illustrating the development of the connections in the system of Fig. 1 during acceleration: Figs. 8, 9 and 10 are similar views illustrating the development of the decelerating process; and Fig. 11 is a diagrammatic view of a control system whereby the switches of Fig. 1 may be operated in the order indicated in Fig. 3.

When operating an alternating-current motor of the commutator type in recuperation, as, for example, in railway work, it is ordinarily difficult to supply an exciting field of the proper phase relation to produce the desired recuperative electromotive force. Ordinarily, the desired exciting field has been produced by an auxiliary source, such, for example, as a phase-converter, as illustrated and claimed in U. S. Patent No. 977,641, granted December 6, 1910, to the Westinghouse Electric & Manufacturing Company on an application filed by B. G. Lamme.

In my copending application Serial No. 95,024, filed May 3, 1916, patented Nov. 11, 1919, No. 1,321,523, I disclose and claim a system wherein an exciting field of the proper phase relation is produced by the joint action of a stator exciting winding and by an auxiliary pair of brushes so energized as to produce an exciting magnetomotive force in the armature winding. These two exciting components are used, either singly or in cumulative or differential combination, to obtain a wide and flexible control of the net exciting field strength. The system described in said copending application is well adapted for recuperation at medium or high speeds but cannot be employed for recuperation to a standstill because of the excessive armature electromotive force produced by transformer action from the necessarily strong inducing field employed for the production of the rotational electromotive force which establishes the exciting field in the armature winding. In the present invention, I obviate this difficulty by directly applying a reverse electromotive force from the line to appropriate brushes on the commutator, whereby said undesired transformer electromotive force from the inducing field winding is substantially neutralized. At the same time, I permit the rotational electromotive force which is necessary for the production of the strong exciting field necessary for generating the desired recuperative electromotive force, at the low speeds in question, to be produced.

For a more detailed understanding of my invention, reference may be had to the drawings wherein I show an alternating-current motor of the inducing-field commutator type at 17 in Fig. 1. Said motor comprises an armature 18 provided with a commutator cylinder upon which bear brushes 19—19 and 20—20. The armature 18 is mechanically coupled, either through gearing or by direct connection, to a car axle 21 by which it is driven during recuperative operation. A main or exciting field winding 22 is mounted with its magnetic axis in alinement with the brushes 20—20 and a cross or inducing field winding 23 is mounted with its magnetic axis in aline-
ment with the brushes 19—19.

Energy for the operation of the motor 17 is derived from any suitable source, such, for example, as the secondary winding 24 of a transformer 25 which may be mounted upon a railway vehicle and have its primary winding energized from the trolley in the usual manner. The outer terminal of the cross field winding 23 may be connected to the winding 24 through a suitable switch 14. An intermediate tap 26, connected between the cross field winding 23 and the armature 18, may be connected to any one of a plurality of taps in the winding 24 by suitable switches 1 to 8, inclusive. A preventive device 27 is employed in conjunction with said switches to smooth out the transition from tap to tap. The right-hand brush 19 of the armature 18 is connected, through the exciting field winding 22, a reversing switch 28 and one winding 29 of a transformer 30, to a lead 31 which may be connected to any one of a plurality of taps in the winding 24 through suitable switches 9 and 13, inclusive, and a preventive device 32. The taps connected to the switches 1 to 8, inclusive, are interspersed between the taps connected to the taps 9 to 13, inclusive, respectively, so that, by the proper manipulation of said switches, the lead 26 may be connected either to the right or to the left of the point of attachment of the lead 31 to the winding 24.

The brushes 20—20 of the armature 18 may be connected together through the other winding 33 of the transformer 30 and a winding 34 of a transformer 35 by the operation of a switch 15, and the remaining winding 36 of the transformer 35 may be connected across the exciting field winding 22 by closing a switch 16.

The switches 1 to 16, inclusive, may be of any desired type, either manually, pneumatically or electromagnetically operated, and a suitable type of electromagnetic switch for use in this relation is indicated in Fig. 2. The operating windings of the various switches are indicated at 1ª to 16ª, inclusive, in Fig. 11, and said windings are energized in the proper sequence from any suitable source of control current by the operation of a control drum 37—37 carrying suitable contact segments 38—38 and 39—39, the former being employed for acceleration and the latter for deceleration.

Figure 4:
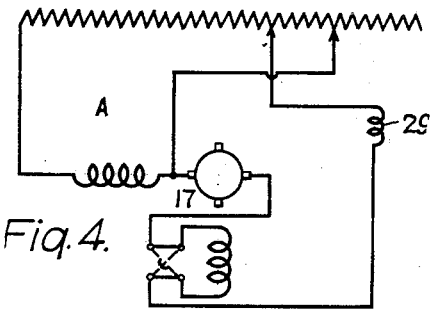
Figure 5:
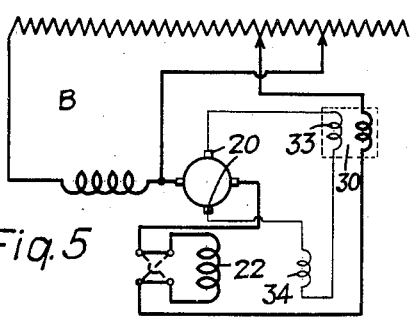
Figure 6:
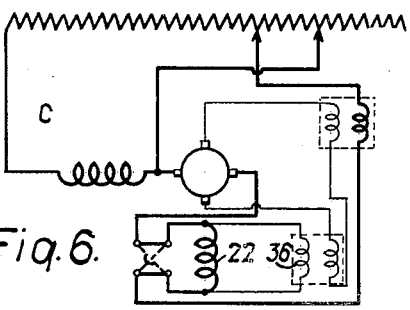

Having thus described the arrangement of a system embodying my invention, the operation is as follows:

The control drum 37 is first moved to the position A, closing the switches 5, 6, 11, 12 and 14 and establishing the circuit connections shown in Fig. 4. The motor 17 is connected for reverse doubly-fed operation; that is to say, the voltage impressed upon the armature winding by the source is in opposition to that impressed upon the inducing field winding, and the winding 29 is connected in the outer armature lead where its reactance exercises a beneficial phase adjustment. The movement of the control drum to the position B then closes the switch 15, connecting together the brushes 20—20 through the windings 33 and 34 and permitting the establishment of an exciting field in the armature winding, as described in my aforementioned application, said exciting field being adjusted in phase by composition with the electromotive force produced in the transformer 30 and suitably combining with the field of the winding 22 to produce the resultant exciting field (Fig. 5). The movement of the control drum 37 to the position C closes the switch 16, connecting the winding 36 of the transformer 35 to the terminals of the exciting field winding 22 to still further weaken the exciting field, as necessitated by the increasing speed of the motor (Fig. 6). The movement of the control drum 37 through the remaining accelerating positions increases the armature applied voltage and decreases the inducing-field applied voltage by moving the point of attachment of the lead 26 to the winding 24 toward the left, resulting in the final connections indicated in Fig. 7, the motor having passed through the repulsion connection and being operated as a doubly-fed motor, with its exciting field derived, in part, from the stator and, in part, from the rotor.

Returning now to the recuperative steps, the control drum 37 is turned, at high speed, to the position H, closing the switches 1, 2 and 14, and is then moved to the position I, closing the switch 15, setting up the connections of Fig. 8, the inducing-field winding 23 alone receiving energy directly from the source and the brushes 20—20 being connected together through the reactive windings 33 and 34 for the production, in the rotor winding, of an exciting field of the proper strength and phase for the generation of the required recuperative current. The movement of the control drum 37 through the positions J, K, L and M connects the outer armature terminal of the right-hand brush 19 to the right-hand portion of the winding 24 through the stator exciter field winding 22 and the winding 29 of the transformer 30. The winding 36 of the transformer 35 is also connected across the terminals of the stator exciting field winding 22. The phase relations are such that there is thus produced a much stronger resultant exciting field, as is necessary for the production of the recuperative voltage at the lower speeds in question. For recuperative action for still lower speeds, approaching a standstill, it is necessary that there be an extremely strong inducing field excitation for the production of the desired rotational electromotive force in the armature winding but it is also desirable that the transformer electromotive force in the armature winding be maintained at a small value. For this purpose, as indicated in position N to S, inclusive, the point of attachment of the lead 26 is moved beyond the point of attachment of the lead 31, which lead, in turn is moved toward the left. There is thus impressed upon the armature winding 18 an electromotive force which tends to neutralize the transformer electromotive force of the winding 23, thus producing the desired weak armature electromotive force required for the relatively small recuperative current at the speeds in question but still permitting the establishment of such an intense exciting field as will permit the generation of the desired recuperative electromotive force.

I claim as my invention:

1. The method of accelerating a single-phase alternating-current motor of the inducing-field type provided with appropriate interconnected brushes for the development of an exciting field within the armature winding, with means for developing an electromotive force between the rotor-exciting field brushes proportional to the armature load current and with means for impressing an electromotive force upon the stator-exciting field proportional to the rotor-exciting field current which comprises the following successive steps (a) first connecting said motor for reverse doubly-fed operation with purely stator excitation for the exciting field (b) operating said motor reverse doubly-fed with joint stator and rotor-exciting field excitation and with an electromotive force impressed upon the circuit of the armature-exciting brushes proportional to the armature load current and (c) operating said motor reverse doubly-fed with joint stator and rotor - exciting field excitation with an electromotive force impressed upon the circuit of the armature-exciting brushes proportional to the armature load current and with an electromotive force impressed across the stator-exciting field winding proportional to the rotor-exciting field current.

2. The method of accelerating a single-phase, alternating-current motor of the inducing-field type provided with appropriate interconnected brushes for the development of an exciting field within the armature winding, with means for developing an electromotive force between the rotor-exciting field brushes, proportional to the armature load current and with means for impressing an electromotive force upon the stator-exciting field proportional to the rotor-exciting field current which comprises the following successive steps (a) first connecting said motor for reverse doubly-fed operation with purely stator excitation for the exciting field (b) operating said motor reverse doubly-fed with joint stator and rotor-exciting field excitation and with an electromotive force impressed upon the circuit of the armature-exciting brushes proportional to the armature load current (c) operating said motor reverse doubly-fed with joint stator and rotor-exciting field excitation with an electromotive force impressed upon the circuit of the armature-exciting brushes proportional to the armature load current and with an electromotive force impressed across the stator-exciting field winding proportional to the rotor-exciting field current and (d) operating as in (c) but direct doubly-fed.

3. The method of recuperatively operating an alternating-current motor of the inducing-field commutator type provided with appropriate interconnected brushes for rotor-exciting field excitation connected to driving means and further provided with means for introducing an electromotive force in the rotor-exciting field circuit proportional to the armature load current and with means for impressing an electromotive force across the stator-exciting field winding proportional to the current flowing in the rotor-exciting field circuit which comprises, at high speeds, operating said motor with solely the inducing-field winding connected to the source and with purely rotor-exciting field excitation and, at lower speeds, establishing a doubly-fed connection wherein the exciting field is produced jointly by rotor and stator-exciting means.

4. The method of recuperatively operating an alternating-current motor of the inducing-field commutator type provided with appropriate interconnected brushes for rotor-exciting field excitation connected to driving means and further provided with means for introducing an electromotive force in the rotor-exciting field circuit proportional to the armature load current and with means for impressing an electromotive force across the stator-exciting field winding proportional to the current flowing in the rotor-exciting field circuit which comprises, at high speeds, operating said motor with solely the inducing-field winding connected to the source and with purely rotor-exciting field excitation and, at lower speeds, establishing a doubly-fed connection wherein the exciting field is produced jointly by rotor and stator-exciting means and said electromotive force proportional to the armature load current is produced in the rotor-exciting field circuit.

5. The method of operating an alternating-current motor of the inducing-field commutator type provided with appropriate interconnected brushes for rotor-exciting field excitation and further provided with means for introducing an electromotive force in the rotor-exciting field circuit proportional to the armature load current and with means for impressing an electromotive force across the stator-exciting field winding proportional to the current flowing in the rotor-exciting field circuit which comprises initially operating said motor with solely the inducing-field winding connected to the source and with purely rotor-exciting field excitation and thereafter establishing a doubly-fed connection wherein the exciting field is produced jointly by rotor and stator-exciting means, said electromotive force proportional to the armature load current is produced in the rotor-exciting field circuit and said electromotive force proportional to the rotor-exciting field current is impressed upon the stator-exciting field winding.

6. The method of operating an alternating-current motor of the inducing-field commutator type provided with appropriate interconnected brushes for rotor-exciting field excitation and further provided with means for introducing an electromotive force in the rotor-exciting field circuit proportional to the armature load current and with means for impressing an electromotive force across the stator-exciting field winding proportional to the current flowing in the rotor-exciting field circuit which comprises successively performing the following steps (*a*) operating said motor with solely the inducing-field winding connected to the source and with purely rotor-exciting field excitation (*b*) establishing a doubly-fed connection wherein the exciting field is produced jointly by rotor and stator-exciting means, said electromotive force proportional to the armature load current is produced in the rotor-exciting field circuit and said electromotive force proportional to the rotor-exciting field current is impressed upon the stator-exciting field winding, and (*c*) altering said last named connections by establishing a reverse doubly-fed connection, whereby an electromotive force derived from the source partially neutralizes the electromotive force induced in the armature from the inducing-field winding.

In testimony whereof I have hereunto subscribed my name this 1st day of Sept., 1916.

RUDOLF E. HELLMUND.